(12) United States Patent
King et al.

(10) Patent No.: US 7,747,778 B1
(45) Date of Patent: Jun. 29, 2010

(54) NAMING COMPONENTS IN A MODULAR COMPUTER SYSTEM

(75) Inventors: James E. King, Wokingham (GB); Karen Roles, Send (GB)

(73) Assignee: Sun Microsystems, Inc., Santa Clara, CA (US)

( * ) Notice: Subject to any disclaimer, the term of this patent is extended or adjusted under 35 U.S.C. 154(b) by 1491 days.

(21) Appl. No.: 10/774,756

(22) Filed: Feb. 9, 2004

(51) Int. Cl.
*G06F 15/16* (2006.01)

(52) U.S. Cl. ........................ 709/245; 709/220; 709/221; 709/223; 709/244

(58) Field of Classification Search ................. 709/245, 709/220–223, 244
See application file for complete search history.

(56) References Cited

U.S. PATENT DOCUMENTS

| 6,247,078 | B1 | 6/2001 | Ebert et al. | |
|---|---|---|---|---|
| 6,452,809 | B1 | 9/2002 | Jackson et al. | |
| 6,556,438 | B1 | 4/2003 | Bolognia et al. | |
| 6,583,989 | B1 | 6/2003 | Guyer et al. | |
| 6,594,150 | B2 | 7/2003 | Creason et al. | |
| 6,654,252 | B2 | 11/2003 | Raynham | |
| 6,742,068 | B2 | 5/2004 | Gallagher et al. | |
| 6,880,086 | B2 * | 4/2005 | Kidder et al. | 713/191 |
| 6,934,786 | B2 * | 8/2005 | Irving et al. | 710/300 |
| 7,023,845 | B1 * | 4/2006 | Simons et al. | 370/389 |
| 7,240,364 | B1 * | 7/2007 | Branscomb et al. | 726/9 |
| 7,263,597 | B2 * | 8/2007 | Everdell et al. | 712/11 |
| 7,266,818 | B2 * | 9/2007 | Pike et al. | 717/176 |
| 2003/0065751 | A1 * | 4/2003 | Autor et al. | 709/220 |
| 2003/0097422 | A1 * | 5/2003 | Richards et al. | 709/217 |
| 2003/0120822 | A1 * | 6/2003 | Langrind et al. | 709/251 |

* cited by examiner

*Primary Examiner*—Nathan J Flynn
*Assistant Examiner*—Mohammad A Siddiqi
(74) *Attorney, Agent, or Firm*—Meyertons, Hood, Kivlin, Kowert & Goetzel, P.C.

(57) ABSTRACT

A method of assigning names to components of a networked computer system is provided. The networked computer system includes at least one modular computer system having at least one service processor module and a plurality of information processing modules removably received in a modular computer system housing. The method comprises: receiving at the service processor module a naming command message including a naming format from a management entity of the networked computer system. The method also comprises assigning at the service processor module a name to the service processor module and to the information processing modules received in the housing in accordance with the naming format; and transmitting a message from the service processor module to a domain name server of the networked computer system, the message including an IP address of each module and the name assigned to each respective module.

20 Claims, 12 Drawing Sheets

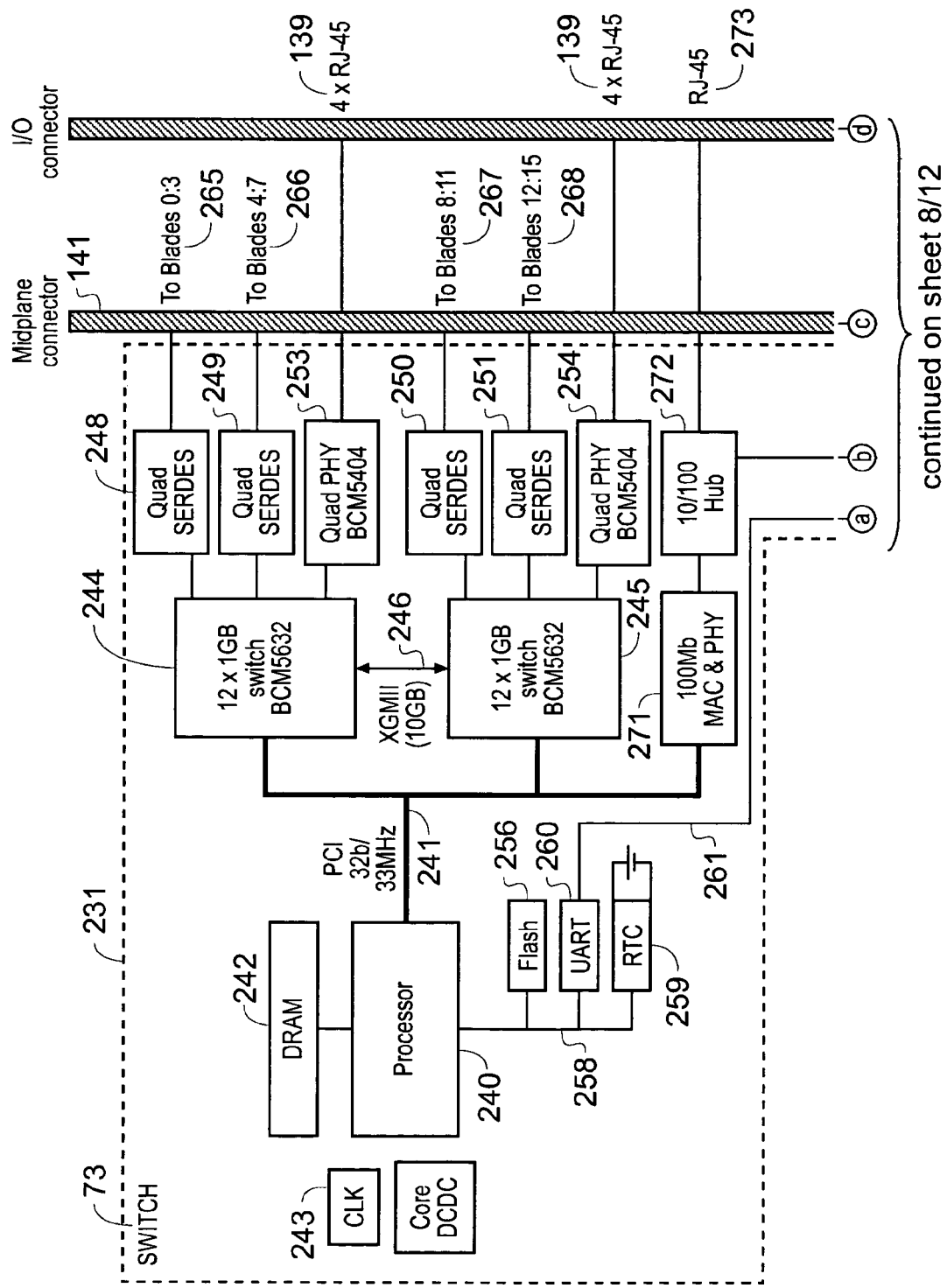

| BUILDING LOCATION | RACK LOCATION | RACK SHELF | SHELF COMPONENT |
|---|---|---|---|

Fig. 8A

| SanD | R34 | S2 | B4 |
|---|---|---|---|

NAMING COMPONENTS IN A MODULAR COMPUTER SYSTEM

BACKGROUND OF THE INVENTION

The present invention relates to naming, and in particular, but not exclusively to an automated system, component naming convention.

One application for the present invention relates to high density computer systems, for example, computer server systems for telecommunications applications. In telecommunications applications, it is important to provide high reliability and high capacity of operation. Various approaches have been taken to providing such high-performance, high reliability systems. Typically such systems are designed around providing redundant resources so that if one component of the system develops a fault, the system remains operational using the redundant resources. Fault tolerance can also be achieved, for example, with multiprocessor systems that provide redundancy through dynamic, e.g., software-controlled, task distribution. High density systems are typically rack mountable, with one or more processor systems occupying a shelf in the rack. The trend in recent times is to make the computers with smaller form factors. This means that more computers can be located in a rack. This has the advantage of increasing the processing density within the racks, and also the advantage of reducing the distance between the computer systems.

The present invention relates to managing system component naming for such a computer system in an efficient manner.

SUMMARY OF THE INVENTION

In a first aspect, there is provided a modular computer system comprising at least one service processor module and a plurality of information processing modules removably received in a modular computer system housing. Each of the service processor module and information processing modules has a predetermined IP address. The service processor module is operable in receipt of a naming command message from an external management entity to assign a name to each service processor module and each information processing module according to a format specified in the naming command message, and to transmit a message to an external domain name server indicating the IP address of each service processor module and each information processing module and the name assigned to each respective module.

This arrangement provides a local management entity operable to perform name assignment in an efficient, controlled manner.

Another aspect provides a method of distributing names to components of a networked computer system including at least one modular computer system having at least one service processor module and a plurality of information processing modules removably received in a modular computer system housing. The method comprises: generating a naming command message at a management entity of the networked computer system and transmitting the naming command message to the service processor module. The method continues with the service processor assigning a name to itself and to the information processing modules received in the housing in accordance with a format set out in the naming command message; and transmitting a message to a domain name server of the networked computer system, the message including an IP address of each module and the name assigned to each respective module.

This method provides a controlled system for efficiently allocating names to computer system FRUs in a controlled, distributed fashion. Thus the processing load associated with the naming process is distributed, reducing the impact of the naming process on overall system performance.

A further aspect provides a method of assigning names to components of a networked computer system including at least one modular computer system having at least one service processor module and a plurality of information processing modules removably received in a modular computer system housing. The method comprises: receiving at the service processor module a naming command message including a naming format from a management entity of the networked computer system and assigning at the service processor module a name to the service processor module and to the information processing modules received in the housing in accordance with the naming format. The method additionally comprises transmitting a message from the service processor module to a domain name server of the networked computer system, the message including an IP address of each module and the name assigned to each respective module.

This method provides a controlled system for efficiently allocating names to computer system FRUs in a controlled, localised fashion. Thus the processing load associated with the naming process is limited to the local system, such that no remote entity has to suffer increased load to perform the naming of the local components.

Particular and preferred aspects of the invention are set out in the accompanying independent claims. Combinations of features from the dependent and/or independent claims may be combined as appropriate and not merely as set out in the claims.

BRIEF DESCRIPTION OF THE FIGURES

Embodiments of the present invention will be described hereinafter, by way of example only, with reference to the accompanying drawings in which like reference signs relate to like elements and in which:

FIG. 8A is a schematic diagram showing an example of a naming format for a shelf component;

FIG. 8B is a schematic diagram showing example naming data for the naming format of FIG. 8A.

Figure 1:
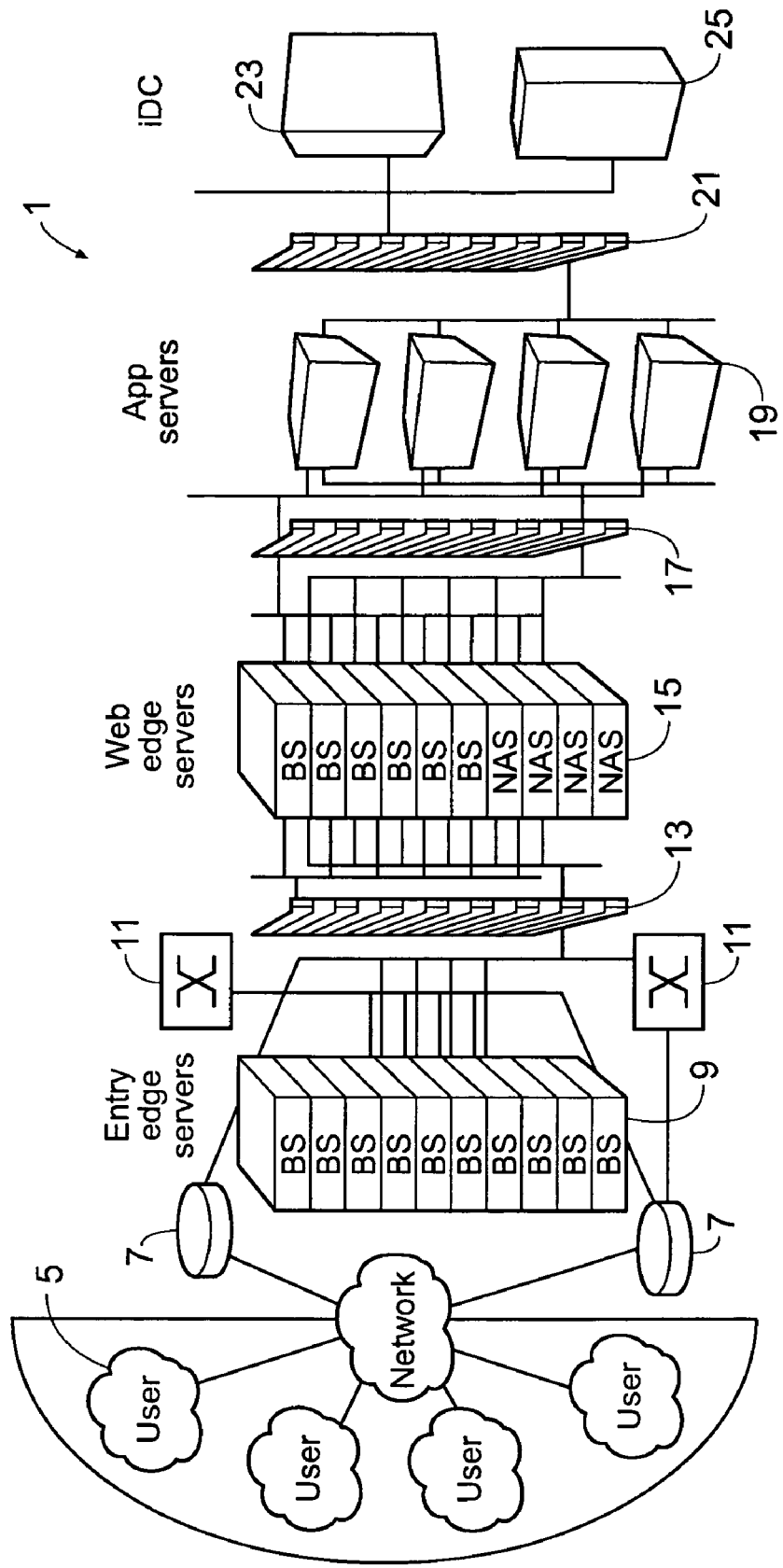
FIG. 1 is a schematic representation of an architecture of a multiprocessor system for supporting a web site.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments and examples are described hereafter by way of example only in the following with reference to the accompanying drawings.

Shown in FIG. 1 is an example of an application of a high capacity multiserver system 1 for implementing a network-connected web site such as, for example, an airline reservation system on the World Wide Web.

As shown in FIG. 1, an external network 3 (e.g., the Internet) for communicating with a user 5 can be connected to gateways 7 which can be connected to an entry edge server group 9 implemented by a web farm. The entry edge server group 9 forms an interface to the external network 3. The entry edge server group 9 can then be connected by switches 11 and a firewall 13 to a web edge server group 15 that can also be implemented as a web farm as shown in FIG. 1. The web edge server group 15 can serve to cache web pages that are readily accessible to users 5 accessing the system 1 from the external network 3, for example for checking flight times, etc. The web edge server group can comprise a number of blade server (BS) shelves and a number of network addressable storage (NAS) shelves for storing critical data. Communications between the blade server shelves may be controlled using a master switch shelf (MS). The web edge server group 15 can be further connected by a further firewall 17 to a plurality of application servers 19, which can be responsible for, for example, processing flight reservations. The application servers 19 can then be connected via a further firewall 21 to computer systems 23, 25, for example, e-commerce services including financial services for receiving and processing payment for airline reservations.

As will be appreciated, the server system described above with reference to FIG. 1 is only an example of a possible application for a multiprocessor server system. Multiprocessor server systems have many different applications and the present system is not limited to being applicable for use in only one or a limited number of such applications, rather multiprocessor server systems as described herein are operable for use in many different applications. A non-exhaustive list of such alternative applications includes: e-commerce web server systems; telecommunications network server systems; LAN application and file server systems and remote vehicle control systems.

Figure 2:
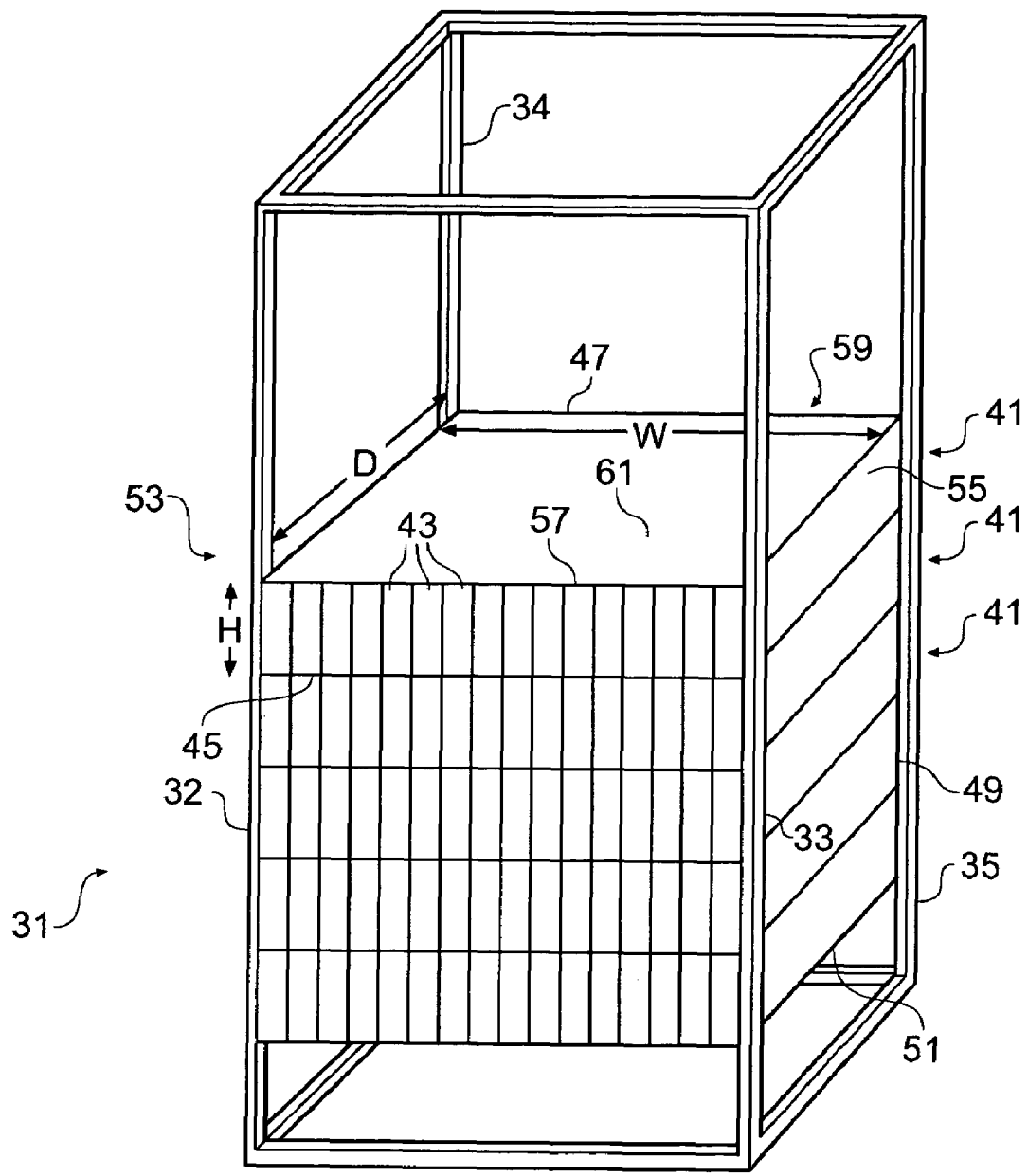
FIG. 2 is a schematic representation of a racking system incorporating an example of a carrier in the form of a rack-mountable shelf according to a first example.

With reference to FIG. 2, there is shown a schematic perspective representation of a rack system 31 as viewed from the front including left and right front uprights 32 and 33 and left and right rear uprights 34 and 35. The uprights can be formed with apertures for receiving shelf fixings (e.g., screws, bolts, clips, etc., for mounting brackets, slides, rails, etc.).

Also shown in FIG. 2 are examples of several blade server shelves 41 mounted in the rack system 31. Each shelf 41 forms a carrier configured to carry a plurality of information processing cartridges 43 located side by side along the shelf.

The term "shelf" is used herein in a conventional way to describe a structure that is mountable in rack system 31 and is configured to carry one or more components to form at least a part of a rack-mountable system. In the present example, the shelf 41 is three-dimensional, having a height (H), width (W) and depth (D). In the present example, one dimension (hereinafter described as the height, H) is smaller than the other dimensions (hereinafter described as the depth, D, and the width, W) to facilitate mounting of the shelf within the rack system 31. It will be appreciated that although the width and depth are typically constrained by the dimensions of the racking system for which the shelf is designed, there is more freedom as regard the height, subject to taking account of any appropriate standards and packaging considerations.

Each of the information processing cartridges contains at least one processor. Each information processing cartridge in the present example is operable as a server. In the described examples, the information processing cartridges are configured as robust enclosed modules.

In the example to be described in more detail presently, the information processing cartridges, when aligned in the carrier shelf, look like rectangular slabs, or blades. Accordingly, an information processing cartridge can be described as a blade. The information processing cartridges 43 comprise information processing modules enclosed in an enclosure, or housing, so that the information processing modules have the form of cartridges. Also, as the information processing cartridges are to operate as computer servers in the example described in more detail presently, an information processing cartridge 43 can also be described as a server blade. Accordingly, in the context of this example, the terms module, cartridge and blade are used interchangeably.

The illustrated example of a shelf 41 is configured to carry sixteen information processing cartridges 43, each of which is removably mountable in a respective opening 45 in the front of the shelf, whereby the information processing cartridges can be inserted into and removed from the front of the shelf 41 without removing the shelf 41 from the rack system 31.

In the present example, the shelf 41 comprises a three-dimensional, generally rectangular, enclosure, or housing, 47 that is suitable for mounting in generic racking systems including both 4-post and 2-post systems. It can be mounted on fixed rigid rack mounting ears and/or a simple slide/support system.

This example of a shelf 41 has a single enclosure, or housing, 47 that houses a number of modular units or subsystems, the majority of which are replaceable in the field and are therefore known as Field Replaceable Units (FRUs). These modular units include the information processing cartridges 43.

The shelf enclosure 47 can be fabricated from sheet material (e.g., from steel sheet) to form a chassis portion 49 that includes a base 51, two sides 53 and 55, a front 57 and a rear 59. The word "front" as used here is merely used as a label herein to refer to the face, or wall 57 of the enclosure that is located at the main access side of the rack system 31 in use when the shelf is mounted therein. Similarly, the words "rear" and "side" are merely used as labels herein to refer to the faces, or walls 59, 53 and 55 that, in use, are located at those respective positions when the shelf is mounted in the rack system 31.

The openings 45 can be formed in the front face 57 for receiving the information processing cartridges 43 and, as will be explained later, apertures can also be formed in the rear face 59 for receiving further FRUs. The enclosure can further include a removable top cover 61 that can be secured to the chassis portion 49 by suitable fastening (e.g., screws). The apertures in the front and rear faces 57 and 59 allow at least some of the FRUs to be inserted into and/or removed from the shelf enclosure 47 via the front or the rear thereof, as appropriate, without removing the shelf from the racking. Access to components mounted in the shelf that are not accessible via one of the apertures in the front 47 and rear 59 faces can be achieved by removing the shelf enclosure 47 from the racking system 31 and then removing the top cover 61 of the shelf enclosure 47.

In the present example, the shelf 41 is configured to receive a plurality of information processing cartridges 43 at the front face of the housing 47. The shelf 41 of the present example is further configured to receive a pair of power supply field replaceable units (PSUs) (not shown) and a pair of combined switch and service processor field replaceable units (CSSPs) 71 at the rear face of the housing 47. The CSSPs 71 of the example provide both switching and management (service processor) facilities for the information processing cartridges 43 received in the shelf 41. The PSUs provide power to the shelf 41 and modules received therein. In the present example redundancy of support modules is provided, that is to say each PSU is independently capable of providing power to each of the maximum number of information processing cartridges 41 receivable within the housing 47 and to each of the CSSPs 71. In addition, each CSSP 71 is independently operable to provide data switching and management services for each of the maximum number of information processing cartridges 41 receivable within the housing 47 and management services to each of the PSUs.

Examples and description of a computer system shelf 41 and various field replaceable modules for use therewith are to be found in published U.S. patent application Ser. No. 10/171,809 filed 14 Jun. 2002, publication serial number US2003/0030988 (corresponding International Patent Application publication number WO 03/014893). Examples and description of a field replaceable unit for providing data switching services for blades received within a computer system shelf 41 are to be found in published U.S. patent application Ser. No. 10/171,794 filed 14 Jun. 2002, publication serial number US2003/0033360. The whole content of each of those documents is hereby incorporated herein by reference in its entirety.

The internal configuration of the shelf 41 and a midplane 171 contained therein is described in the following with reference to FIGS. 3A, 3B and 3C, and FIGS. 4A, 4B and 4C.

Figure 3A:
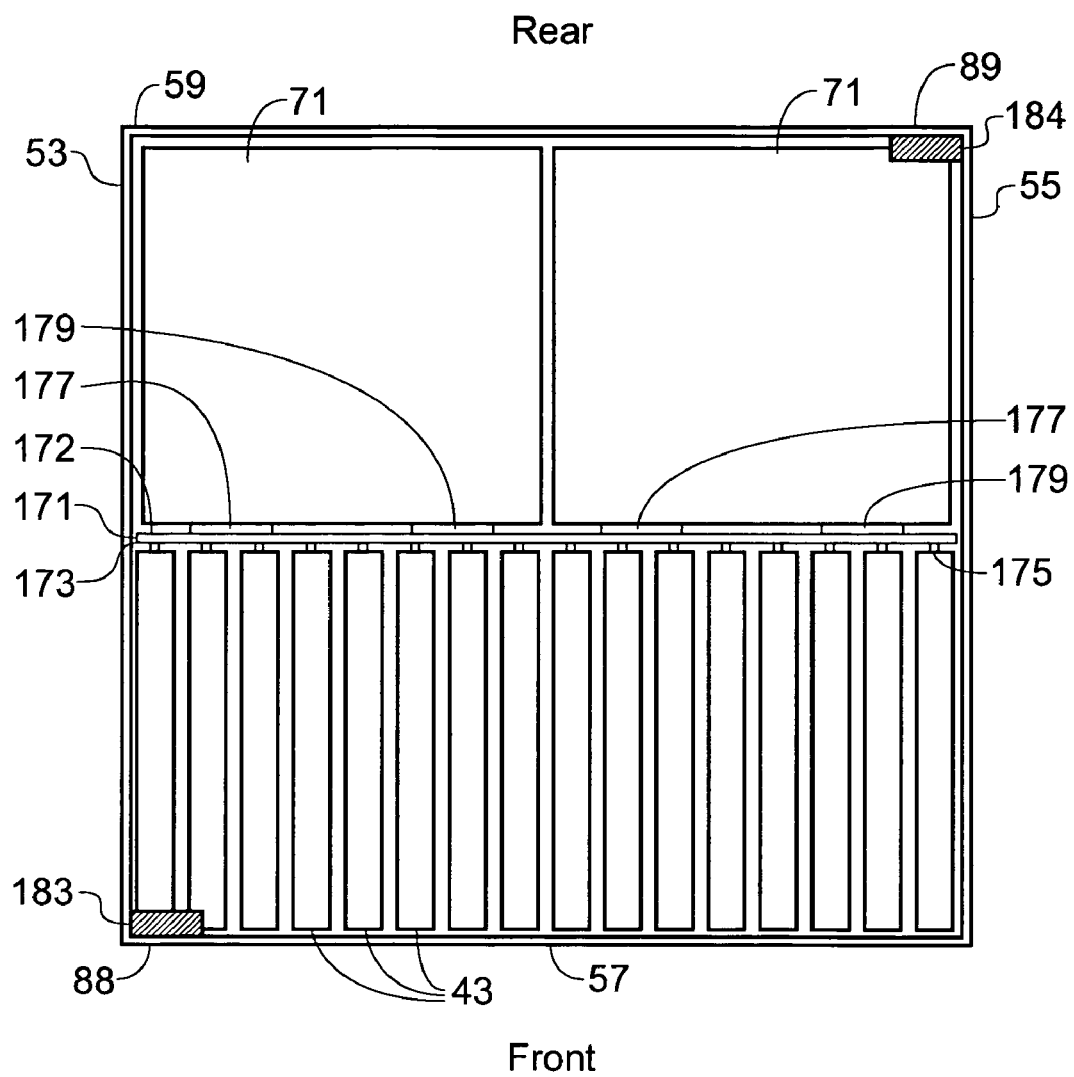
FIGS. 3A, 3B and 3C are a schematic plan view and schematic perspective views, respectively, of an example of the chassis and midplane of the shelf of FIG. 2.
Figure 3B:
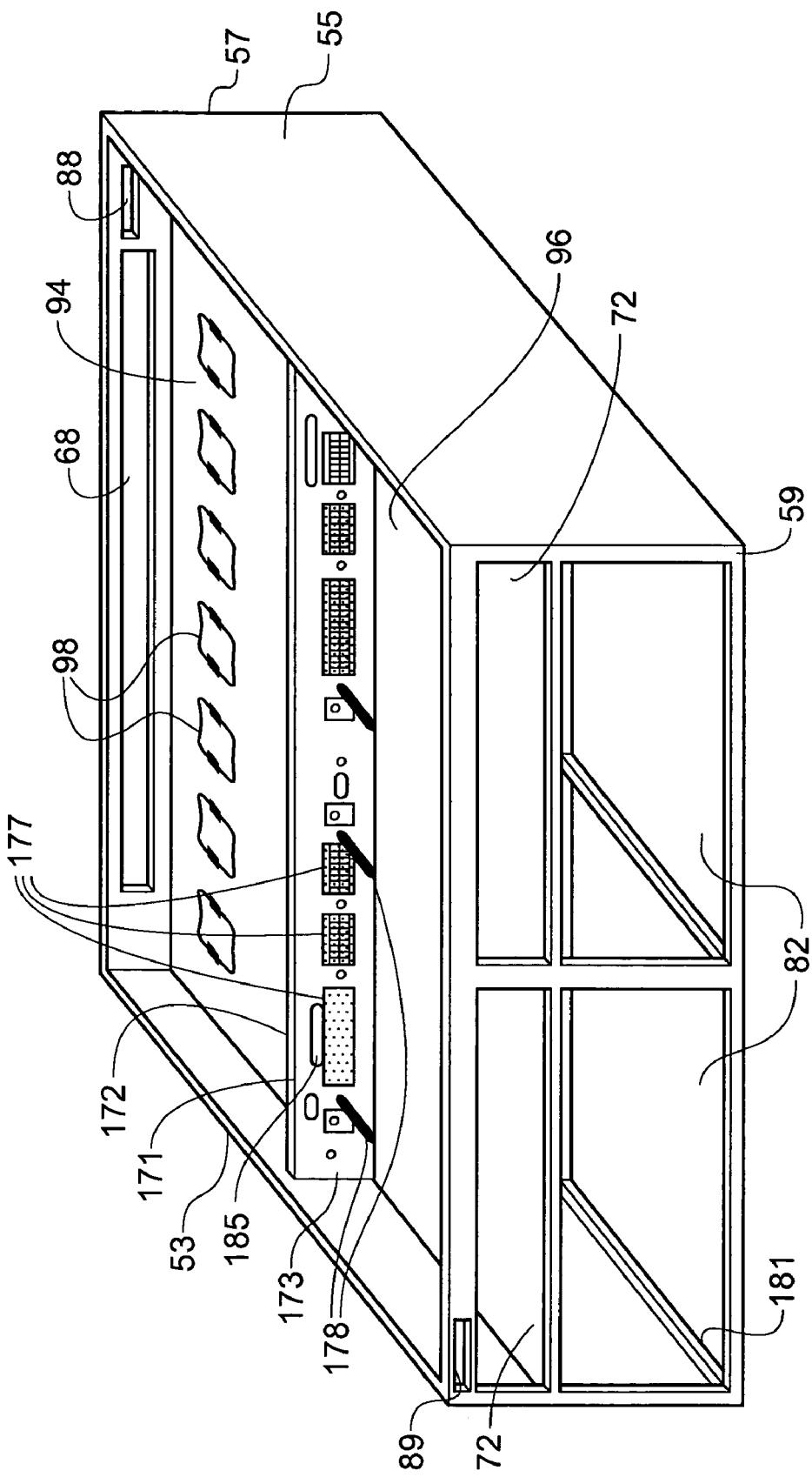
Figure 3C:
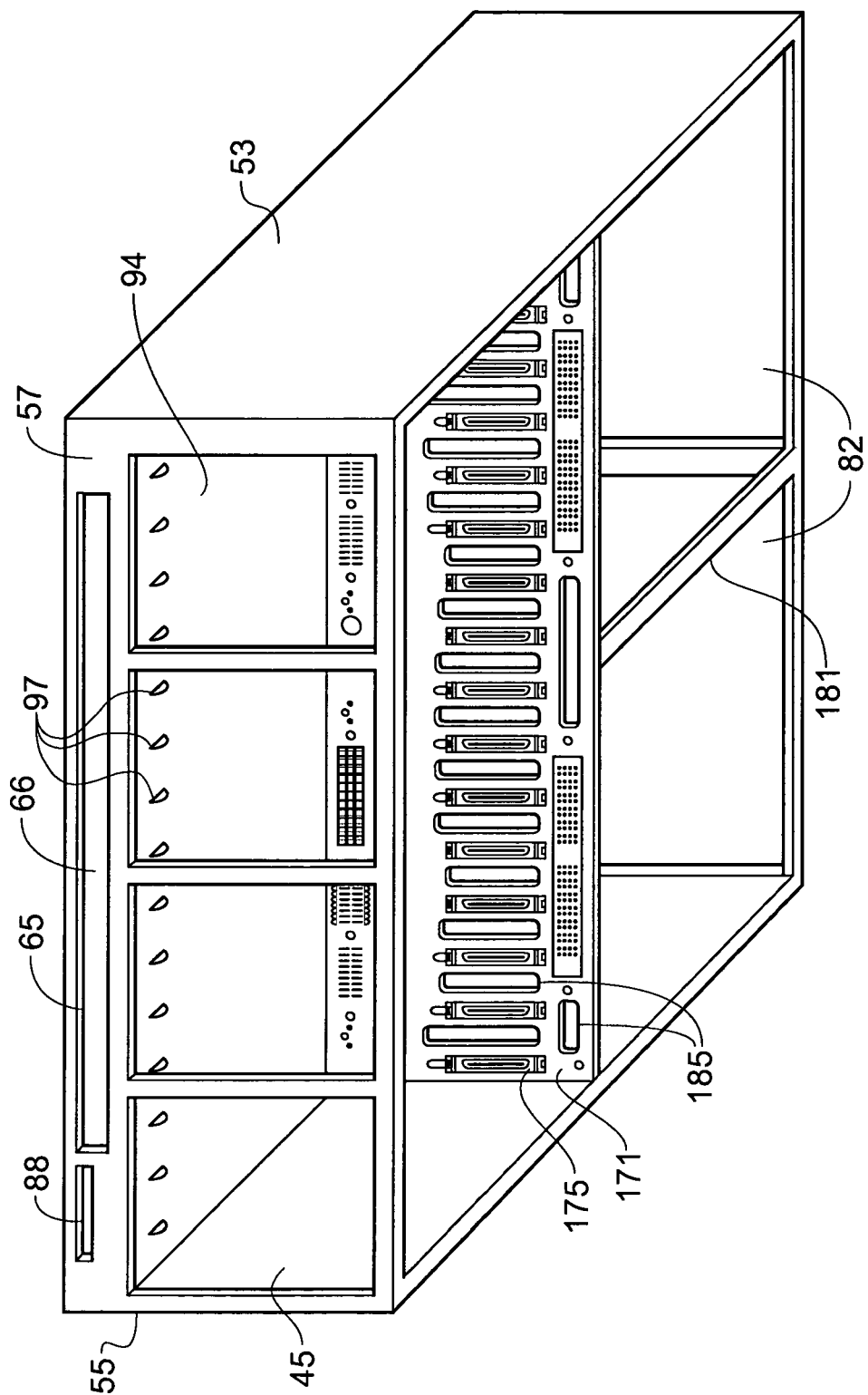
Figures 4A, 4B, 4C:
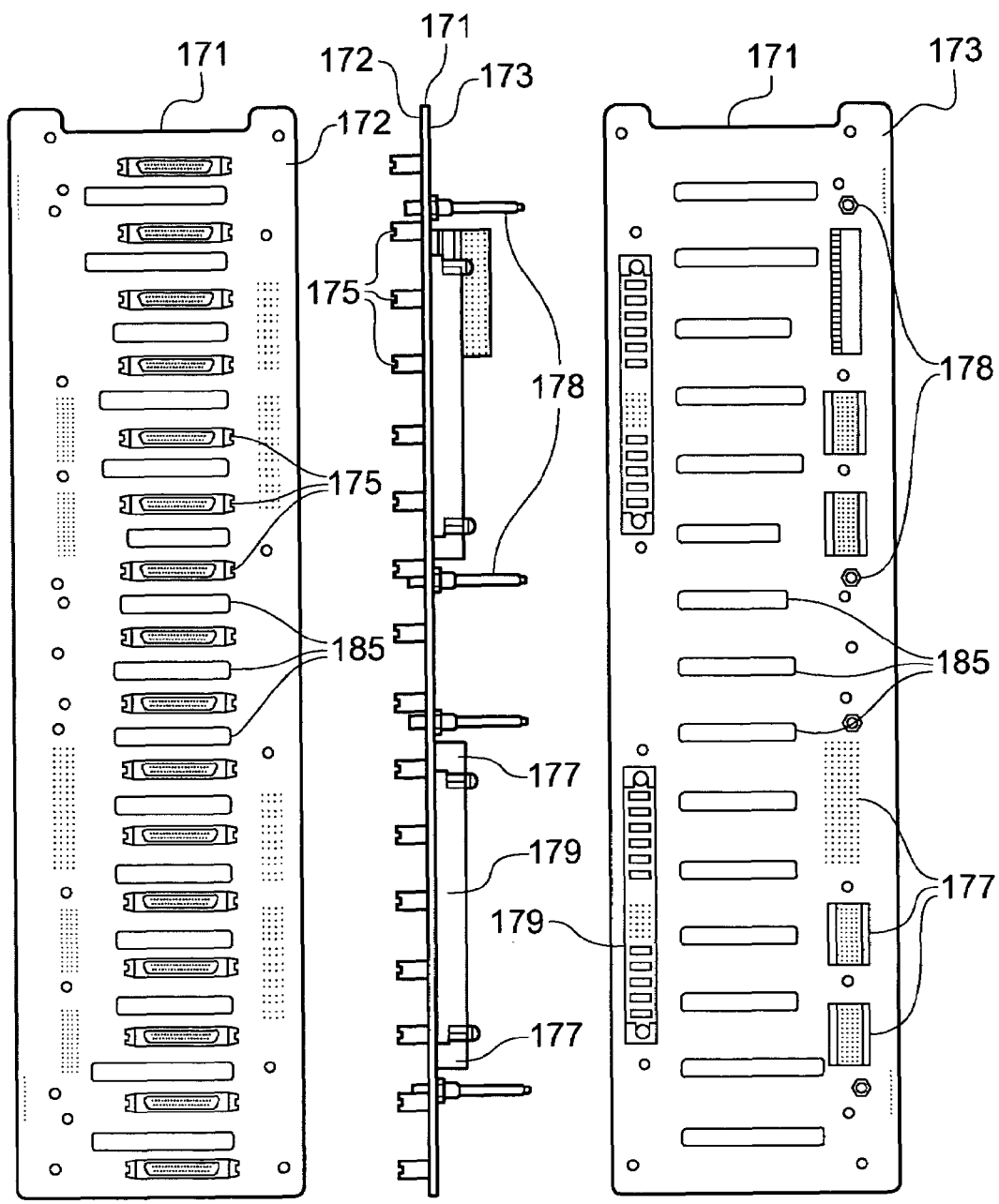
FIGS. 4A, 4B and 4C are schematic front, top and rear views, respectively, of an example of a midplane of the shelf of FIG. 2.

FIG. 3A is a schematic plan view showing the internal configuration of an example of a shelf 41 with the cover 61 removed. FIG. 3B is a schematic perspective view from above the rear of the chassis portion 47 of the shelf enclosure with the field replaceable units removed. FIG. 3C is a schematic perspective view from below the front of the chassis portion 47 of the shelf enclosure with the field replaceable units and the base 51 removed. FIG. 3D is a schematic perspective view from the front and above a part of the base 51 of the shelf 41. FIGS. 4A, 4B and 4C are, respectively, front, top and rear views of the midplane 171. In this example, the midplane is, in use, mounted vertically within the shelf 41 extending across the width W of the shelf 41 at a position approximately half way between the front and the rear of the shelf 41.

The vertically mounted midplane 171 extends, in this example, across the shelf 41 and allows for the electrical interconnection of the FRUs. The various apertures in the front and rear faces 57 and 59 of the shelf 41, in combination with the midplane 171, can be provided with guides (e.g., rails 181) and keying e.g., offset connector positioning for the insertion of the FRUs into the enclosure and midplane 171. The midplane 171 can be a double-sided, or multi-layer printed circuit board (PCB) assembly that can be mounted vertically in a rigid manner within the enclosure. It can carry connectors 175 on a front surface 172 for making electrical connection with corresponding connectors (not shown) on the information processing cartridges 43. It can also carry connectors 177 and 179 on rear surface 173 for making electrical connection with corresponding connectors 141 on the CSSPs 71 and connectors (not shown) on the PSUs. Conductive tracks (not shown) on and through the midplane 171 can be provided to interconnect the various connectors. In addition, the midplane can provide connectors for receiving corresponding connectors connected to first and second indicator boards 183 and 184 that each carry a respective set of LED indicators (not shown). In the present example, the midplane 171 is not configured as a FRU and is not hot swappable. It is perforated to facilitate airflow through the shelf 41. The midplane 171 can include openings 185, which co-operate with openings in the enclosures of the FRUs 43 and, to provide a path for cooling air to pass from the front to the rear of the shelf 41, the cooling air being driven by fans in one or more of the FRUs, for example in the PSUs, possibly also in the information processing cartridges 43.

A plenum chamber floor member 94 can extend horizontally from the front of the midplane 171 to the front face 57 of the shelf enclosure, or chassis 47. The member 94 provides a floor for a plenum chamber 66, which is supplied with air via the apertures 65 in the front bezel and, in the illustrated example, the slot shaped aperture 68 in the front face 57 of the shelf enclosure 47. Although, for reasons of ease of illustration a slot shaped aperture 68 is shown, a plurality of apertures 68 aligned with the blade receiving locations may be provided. The aperture or apertures 68 can serve both as air vents for a flow of air to the plenum chamber 66, and also as latching locations for latching portions of, for example, injector/ejector levers of processing cartridges 43 to be received within the shelf 41. The top and sides of the plenum chamber are provided by the top cover 61 and side faces 53 and 54 of the shelf enclosure 47.

A CSSP/PSU divider 96 can be provided to the rear of the midplane 171 and can extend horizontally to the rear face 59 of the shelf enclosure 47. The CSSPs 71, when inserted, are supported by the divider 96. To aid the correct insertion of the CSSPs 71, CSSP guide pins 178 are provided on the midplane 171 at positions adjacent connectors 177 on the midplane 171 for connection to the CSSPs 71.

Respective positions 88 and 89 can be formed in the front face 57 and the rear face 59 at which first and second indicator boards 183 and 184 supporting the indicator LEDs can be located. These positions 88, 89 therefore include an aperture through the respective face of the shelf enclosure 47 such that indicator LEDs mounted onto a circuit board attached to the inside of the shelf enclosure 47 may be viewed from outside the shelf enclosure.

There now follows are more detailed description of the midplane 171.

As mentioned above, the midplane 171 connects all the elements of a shelf together, including, in the present example, up to sixteen information processing cartridges 43, up to two CSSPs 71, two PSUs and the two indicator boards 183 and 184. In the present example, due to its location within the shelf enclosure, the midplane 171 is not configured to be swappable. Accordingly, to maximize the system reliability, the midplane is configured to provide as a high level of reliability as possible. To this end, the midplane is advantageously configured without active devices and to include the minimum number of decoupling capacitors consistent with good design practice (ideally zero).

The midplane supports a number of paths for various power and signal lines to interconnect the FRUs.

In the present example, each information processing cartridge 43 has a high speed information signal connection (e.g., a Gigabit (Gb) Ethernet SERializer/DESerializer (SERDES) connection) to each of the CSSPs 71, each connection consisting of two pairs of differential signals. In a conventional manner therefore, the tracking of the paths for these signals is arranged to keep the pairs well balanced and on a single signal layer (i.e. without vias) to support such differential signals at high frequency.

In addition, in the present example, each information processing cartridge 43 has a serial console connection to the CSSP cartridge 71. Each connection consists of two TTL (Transistor-Transistor Logic) level signals that make a transmit and return (TX and RX) pair.

Also, each PSU has a management signal connection (e.g., a serial I2C (Inter-IC Bus) connection) to the CSSP cartridge 71 to control power and monitor environmental parameters. The I2C bus comprises of two signals SCL and SDL (serial clock line and serial data line). In addition, an I2C address programming pin is provided for the PSUs.

Each information processing cartridge 43 and PSU can signal to the CSSP cartridge 71 that it is inserted by pulling to ground (GND) a respective Inserted_L signal (i.e., an active low signal). These signals are fed to the CSSP cartridge 71 via the midplane 171.

Each PSU has five 12 Volt output rails. The routing from each PSU is arranged so that a fault in any single FRU cannot completely interrupt the power to any other.

As mentioned above, the midplane 171 is provided with appropriate connector arrangements for receiving the connectors on the FRUs.

In the present implementation, indicator boards 183 and 184 (see FIG. 8A) are provided at the front and rear of the system and are configured as FRUs. In this example they hold three system-level indicator LEDs and include a FRU identity (FRU-ID) programmable read-only memory (PROM) each. Three LEDs are present on the indicator board. There can, for example, be a white locator LED that can be switched by the user for locating the system; a green power-on LED to indicate when the system is powered; and an amber service-required LED to indicate a fault or other condition requiring servicing. These LEDs can be driven by the CSSP 71.

In the present example, identification information (FRU ID) for the midplane 171 is held on an I2C electrically erasable programmable read only memory (EEPROM) in the front indicator board 183. In addition to the I2C signals necessary to access the FRU ID EEPROM, the CSSPs 71 provide a current limited supply to the indicator boards 183 and 184 via the midplane. The indicator boards 183 and 184 are also provided with an I2C address programming pin. Depending on the implementation, FRU ID information can be stored instead, or in addition, on the rear indicator board 184.

As the FRU-ID for the midplane 171 is held on one or both of the indicator boards 183 and 184, the midplane can be a totally passive unit. The FRU-ID PROMs communicate with the CSSPs 71 via an I2C bus. Each device on the bus has a separate I2C address. The lower three I2C address bits of the EEPROMs used are available as pins on the device, to allow programming with resistors. The least significant bit of this address (A0) is passed to the midplane via the corresponding connector. This allows the midplane 171 to program the address of the FRU-ID differently for the front and rear indicator boards 183 and 184, by pulling the address low for the front board and high for the rear indicator board 183. This ensures that both EEPROMS are available on the bus, at different addresses. The FRU-ID for the midplane can be stored on either front or rear EEPROM, but the present example the FRU-ID is stored in the EEPROM on the front indicator board 183. The EEPROM can be 8 kByte or larger.

As mentioned above, the midplane 171 includes openings 185 to provide a ventilation path for cooling air passing through the shelf 41. The cooling air passing through the shelf 41 via the midplane 171 can be driven by means of fans provided in each of the information processing cartridges 43 and the power supply modules. The openings 185 shown in FIGS. 8B, 9A, 9B and 9C form schematic representations of openings in the midplane 171. In practice, the openings could have any form (i.e., a series of large openings, or a number of small perforations), arranged on the midplane to align with corresponding openings or ventilation apertures in the various field replaceable units 43, 71 and the PSUs. In this way, the path of the airflow from the front of the shelf to the back of the shelf can be configured to be as efficient as possible, depending on the detail configuration of the fan units and the ventilation openings or apertures in the information processing, switch, service processor and power supply unit modules. Providing the fan units in the field replaceable units 43, 71 and PSUs, contributes to the aim of maintaining the chassis 49 and the midplane 171 of the shelf 41 free of active components, thereby minimising cost, and facilitating maintenance. Also, by providing the fan units in each of the field replaceable units, merely inserting and removing field replaceable units automatically adapts the flow of cooling air to the number and type of field replaceable units inserted in the shelf 41.

As described above, in the present example each of the FRUs is designed to be a non-user serviceable unit. Thus each FRU presents the user with a "sealed" unit which may be inserted into and removed from the shelf 41 as desired or required. If a FRU ceases to be operable, then the user has a choice only of returning the FRU to a supplier or service company for repair or of discarding the non-operable unit. As the FRUs are non-user serviceable, there is no requirement for a skilled technician to be employed in inserting or removing the FRUs into or from a shelf 41. Thus each FRU is designed such that a non-skilled person should have difficulty in causing damage to the FRU during handling. Moreover, the configuration and construction of the FRUs (e.g., provision of injector/ejector levers, grooves in the enclosures of the information processing units, etc), of the shelf enclosure and the midplane (e.g., the guide rails to guide insertion of the FRUs, the locating pins, etc) contribute to facilitating easy insertion and removal of the FRUs.

Thus the general structure and arrangement of a computer system shelf 41 and the FRUs which it is operable to receive can be understood. As the skilled addressee will appreciate, particularly with reference to FIG. 1 above, a plurality of computer system shelves 41 may be utilised in combination to provide a large distributed processing system, for example a server farm such as a web farm.

Figure 5:
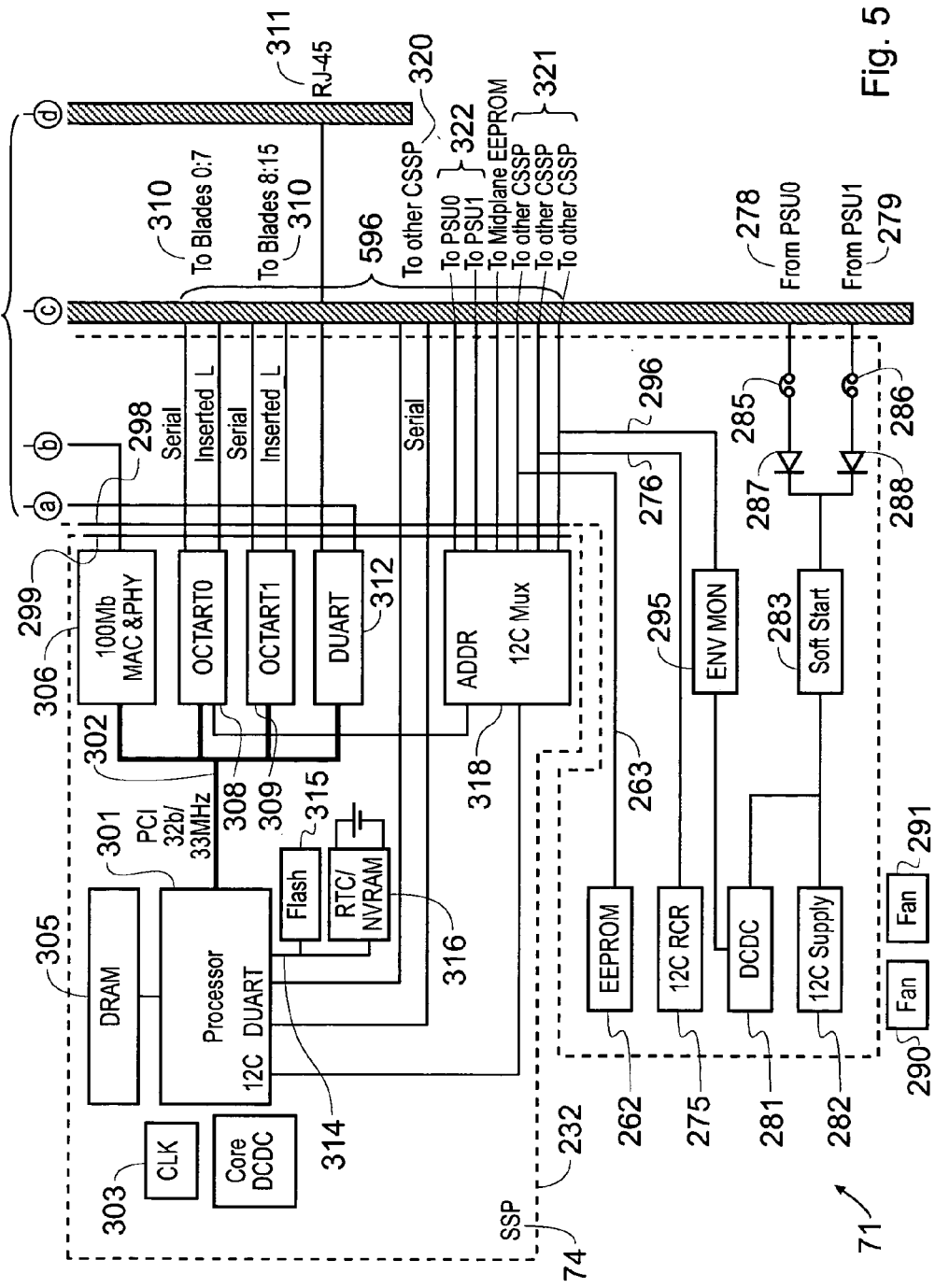
FIG. 5 is a functional block diagram of an example of an information processing subsystem for the combined switch and service processor module for the shelf of FIG. 2.

In the present example, the CSSP 71 is operable to provide flexible, high bandwidth, highly configurable interconnections between computer system shelves 41. FIG. 5 shows an example of how a plurality of computer system shelves may be interconnected in a logical stacking arrangement using the interconnections facilities provided by the CSSP 71. A full description of examples of combined switch and service processor modules can be found in U.S. patent applications Ser. Nos. 10/653,029 and 10/653,030. The whole content of each of those documents is hereby incorporated herein by reference, in its entirety.

With reference to FIG. 5, there now follows a description of an example of a combined switch and service processor (CSSP) 71. In the present example, each CSSP 71 provides the functionality of a Switch 73 and of a Shelf Service Processor, or Shelf Service Processor (SSP) 74.

FIG. 5 provides an overview of the functional components of the CSSP 71 including functional components of the Switch 73 and functional components of the SSP 74. In the present example, most of the components relating to the Switch 73 are mounted on a Switch PCB 231, and the components relating to the SSP 75 are provided on a SSP PCB 232. However, it should be noted that the components located in the lower portion of the switch PCB 321 (i.e., that portion below the SSP PCB 232 as illustrated in FIG. 5 logically belong to the SSP 74, rather than to the switch 73. It will be appreciated that such component arrangements are not necessary for successful operation and that any other component arrangement over any number of component boards can be easily achieved using conventional component arrangement techniques.

Firstly, with reference to FIG. 5, there follows a description of functional elements of the Switch portions 73 of a CSSP 71 as contained within the CSSP enclosure 121.

The midplane connector 141 on the CSSP 71 establishes the connection between the CSSP 71 and the midplane 171. In the present example, it delivers SERDES outputs 265-268, I2C signals 310, 320, 321 and 322, and power 278, 279. The connector can be configured to facilitate hotswapping of the board, for example with a low insertion force. The connector can also use guide pins to increase the ease of serviceability and prevent module misalignment during insertion.

A switch microprocessor 240 is provided along with associated memory 242. The processor 240 can be connected to a PCI bus 241.

A clock input to the processor 240 can be provided by a clock generator (CLK) 243. The CLK 243 can include a configurable clock generator (not shown) implemented as a programmable clock synthesiser employing a crystal used to produce CPU clock signals. The clock frequency can be determined by jumper settings (not shown). A vectored interrupt controller (I-Chip) (not shown) and a configurable core voltage regulator module (VRM) (not shown) can be provided that operate substantially as described above with reference to the like components of FIG. 11.

In the present embodiment two switch ASICs (application specific integrated circuits) 244, 245 are provided. Each ASIC can provide twelve GMII Interfaces (1 Gigabit Ethernet) (for uplinks and downlinks) and one 10 Gb XGMII interface for chip-to-chip communication (bridging) 246 between the ASICs 244 and 245. Sixteen GMII 1 Gb 'downlinks', in the form of serialized Gb Ethernet data, are provided through four quad SERDES 248-251 to allow each information processing cartridge 43 to communicate with the switch 73. Eight GMII 1 Gb 'uplinks' are provided for external communication through two quad PHYs 253 and 254 (in the present example BCM5404 ASICs) and RJ45 connectors on the rear panel 122. The ASICs 244 and 245 are configured via a PCI interface to the PCI bus 241.

A Flash PROM 256 can store a real time operating system, and management and configuration data for the microprocessor. The flash PROM 256 can be operated via an on-chip XBus 258.

Also connected to communicate with the processor 240 via the XBus 258, a Real Time Clock (RTC) 259 can be provided for real-time functions with a back-up battery.

Also connected to the XBus 258 can be a UART (Universal Asynchronous Receiver Transmitter) 260 which in turn connects to a serial bus 261 for providing an asynchronous console connection from the switch 73 to the SSP 74 which can be accessed by the SSP.

An integrated MAC/PHY (Media Access Control/Physical) switch 271 can provides its own interface to the PCI bus 241. This MAC/PHY switch 271 can connects to a 10/100 Ethernet hub 272. The hub 272 can be operable to provide a management interface to the SSP 74 and a connection from an external management network to the switch 73 and SSP 74 of a given CSSP 71. The connection from the integrated MAC/PHY device 271 to the SSP 74 can be coupled capacitively. A loopback mode can be provided by the MAC/PHY device 271 for system diagnostics. The hub 272 can connect to an RJ45 connector 273 on the rear panel 122 of the CSSP enclosure 121.

An I2C EEPROM 262 can be used to store the FRU-ID and is accessible by the SSP portion 74 of each CSSP 71 via a serial bus 263 and the midplane 171. A portion of the EEPROM 262 can be configured to be write protected.

An I2C Redundant Control Register (RCR) 275 can be used to provide an alternate, redundant path for poweringdown the CSSP 71 and Shelf Level Indicators mounted on the front 57 and rear 59 panels of the shelf 41. The I2C RCR 275 can be accessible by both the SSP 74 of the CSSP 71 containing the RCR and the SSP 74 of a further CSSP 71 connected via the midplane 171 via an I2C bus 276.

With continued reference to FIG. 5, there now follows a description of functional elements of the Shelf Service Processor (SSP) portion 74 of a CSSP 71 as contained within the CSSP enclosure 121 and provided on an SSP PCB 232.

In the present example, communication between the Switch PCB 231 and the SSP PCB 232 is facilitated by an interboard connector pair 298 and 299. It supports connections (pins) for I2C signals, 10/100 MAC/PHY output, and power. As described above, the switch PCB 231 carries the components associated with the switch, and it also carries the power, FRU-ID and environmental monitoring components along with the connectors for connections to the midplane 171 and external connectors. Thus, in the present example, all SSP components requiring a connection to the midplane 171 or an external connection have signal paths routed through the connector pair 298, 299 and via the switch PCB 231 to the relevant midplane or external connectors.

In the present example, the SSP 74 includes a microprocessor 301 mounted on the SSP printed circuit board (PCB) 232. The processor 301 can be connected to a PCI bus 302.

A clock input to the processor 301 can be provided by a clock generator (CLK) 303 as described above for switch processor 240. A vectored interrupt controller (I-Chip) (not shown) and a configurable core voltage regulator module (VRM) (not shown) can also be provided. The processor 301 can be provided with memory 305. The memory capacity can be chosen to suit the processor addressable memory space.

An integrated MAC/PHY switch 306 can provide its own interface to the PCI bus 302. The MAC/PHY switch 271 can be connected to 10/100 Ethernet hub 272 via the interboard connectors 298, 299. A loopback mode can be provided by the MAC/PHY switch 306 for system diagnostics.

Octal UARTs 308 and 309 can be connected between the PCI bus 302 and the interboard connector pair 298, 299. The signal path can be continued from the interboard connector pair 298, 299 to serial connections 310 on the midplane connector 141 on switch PCB 231. The Octal UARTS 308, 309 can facilitate serial communications between the SSP 74 and each of the processing cartridges 43.

Also connected to the PCI Bus 302 can be a dual UART (DUART) 312 that in turn can connect via the interboard connectors 298, 299 to serial bus 261 for providing an asynchronous console connection from the SSP 74 to the switch 73. The DUART 312 can also have an I2C connection to an external connector on the rear face 122 of the CSSP enclosure 121. The external connector can provide a common operating system/boot console and command port 311.

Connected to the processor 301 via an XBus 314 can be a Flash PROM 315. The Flash PROM 315 can store a real time operating system, and management and configuration data for the microprocessor 301. The Flash PROM 315 can be operable in the present example to hold up to 2 MB of data, depending on the software required.

Also connected to the processor 301 via the XBus 214 can be a real time clock (RTC) 316 for real-time functions with a backup battery. The RTC 316 can also provide non-volatile random access memory (NVRAM. This can be used to contain information such as the FRU-ID, a serial number and other FRU information.

To facilitate I2C communications between the SSP 74 and the other CSSP 71, the midplane 171 and the PSUs, a multiplexer 318 can be provided. The multiplexer 318 can have a single I2C connection to the processor 301 and connections, via the interboard connector pair 298, 299 and the midplane connector 141 to both PSUs, the midplane 171 and the other CSSP 71.

The processor 301 can also comprise an embedded DUART to provide a redundant serial link to the SSP 74 of the other CSSP 71. Although it would be possible to implement this link using an external DUART, the advantage of using an embedded DUART is that the connection to the other CSSP is reliable and therefore likely to be functional. Where the embedded DUART link does not use the I2C Multiplexer for communications to the other CSSP, a common mode of failure for both the SSP-SSP I2C links can be avoided, it being assumed that the processor 301 is likely to be functional even if both embedded DUART channels are non-functional.

The CSSP 71 can powered from two, diode commoned, power supply rails 278 and 279. DC/DC converters 281 can be used to provide the voltage levels required by the CSSP 71. The DC/DC converters 281 can be supplied by dual inputs 278, 279, individually fused 285, 286 and then diode commoned 287, 288. A soft start controller 283 can be provided to facilitate hot-insertion. An I2C power regulator 282 can be turned on as soon as the CSSP 71 is fully inserted. A DC/DC converter 281 can be turned on when instructed, for example through SSP service software, by asserting low an appropriate signal (ON_L—not shown). The converter 281 can be arranged to turn on a plurality of voltage rails as required for the components of the CSSP.

When the CSSP 71 is inserted the inrush current can be limited and the rate of rise can be configured not to exceed a predetermined value to provide a so-called soft start to facilitate hot-insertion. The intent is to prevent damage to the connectors and to avoid generating noise. A soft start controller 283, which controls a ramping-up of voltage levels, can be enabled when a predetermined signal is asserted. This signal may be fed from a short pin in the connector connected to ground through the midplane 171 until one of the supplies is removed. These circuits can be configured to withstand an overvoltage at their inputs whilst the input they are feeding is not powered, without any leakage to the unpowered circuit. A sense circuit can detect if the voltage has dropped below a threshold as a result of a blown fuse, a power rail going down, etc. The DC/DC converters 281 can be protected against short circuit of their outputs so that no damage occurs.

The I2C regulator 282 can be powered as soon as the CSSP 71 is fully inserted into the midplane 171. This can be facilitated through short pins connected to the soft start controller 283, which controls a ramping-up of voltage levels. The other DC/DC regulators can be turned on, for example by SSP software.

A pair of fans 290, 291 can provide cooling to the CSSP 71. The fans 290, 291 can be configured to run at full speed to prevent overtemperature conditions by minimizing the temperature of the internal components and the fan. The speed of the fans 290, 291 can be monitored by the SSP 74 through an environmental monitor 295 on the switch board 231. The environmental monitor 295 can be alerted in the event of the fan speed falling below a predetermined value (e.g., 80% of its nominal speed). The fan can provide tachometer outputs to facilitate the measurement of fan speed.

LED indicators 137 can be provided, for example with a green power LED, an amber LED for indicating that service is required and a blue LED for indicating that the switch is ready to be removed. LED indicators integrated on 2×4 stacked RJ45 connectors on the rear face of the CSSP 71 can be arranged, for example, to show green continually when the link is present and flash green when the link is active.

The environmental monitor ENV MON 295 can be provided to maintain operational integrity of the CSSP 71. The ENV MON 295 can include limit values in limit registers and can monitor, for example, temperature within the CSSP enclosure 121, the CSSP power rails and the two power feed rails 278, 279 from the midplane 171. The outputs of the DC/DC converters 281 can be fed to the ENV MON 295 for Watchdog purposes. As noted above, the ENV MON 295 can also monitor the operating speeds of the fans 290 and 291. The ENV MON 295 can communicate with the SSP 74 of both CSSPs via an I2C bus 296.

For IO to the midplane 171 shown in FIGS. 4A-C, the midplane connector 141 can include sixteen 1 Gb Ethernet connections 265-268 from four quad SERDES 248-251 and the I2C bus lines 596.

The SSP 74 can access the I2C devices (FRU-ID EEPROM, 8-bit I/O expansion chip, and the system hardware monitor) through the midplane 171.

For external IO, rear panel Gb Ethernet connections can be provided from the two quad PHYs 253, 254 to 2×4 stacked RJ45 connectors 139 (to give 8 uplinks). Each port can be an independent 10/100/1000 BASE-T (auto negotiating) port. The PHY devices 253, 254 can operate in GMII mode to receive signals from the 8-Gigabit interfaces on the ASICs 244, 245.

Figure 6:
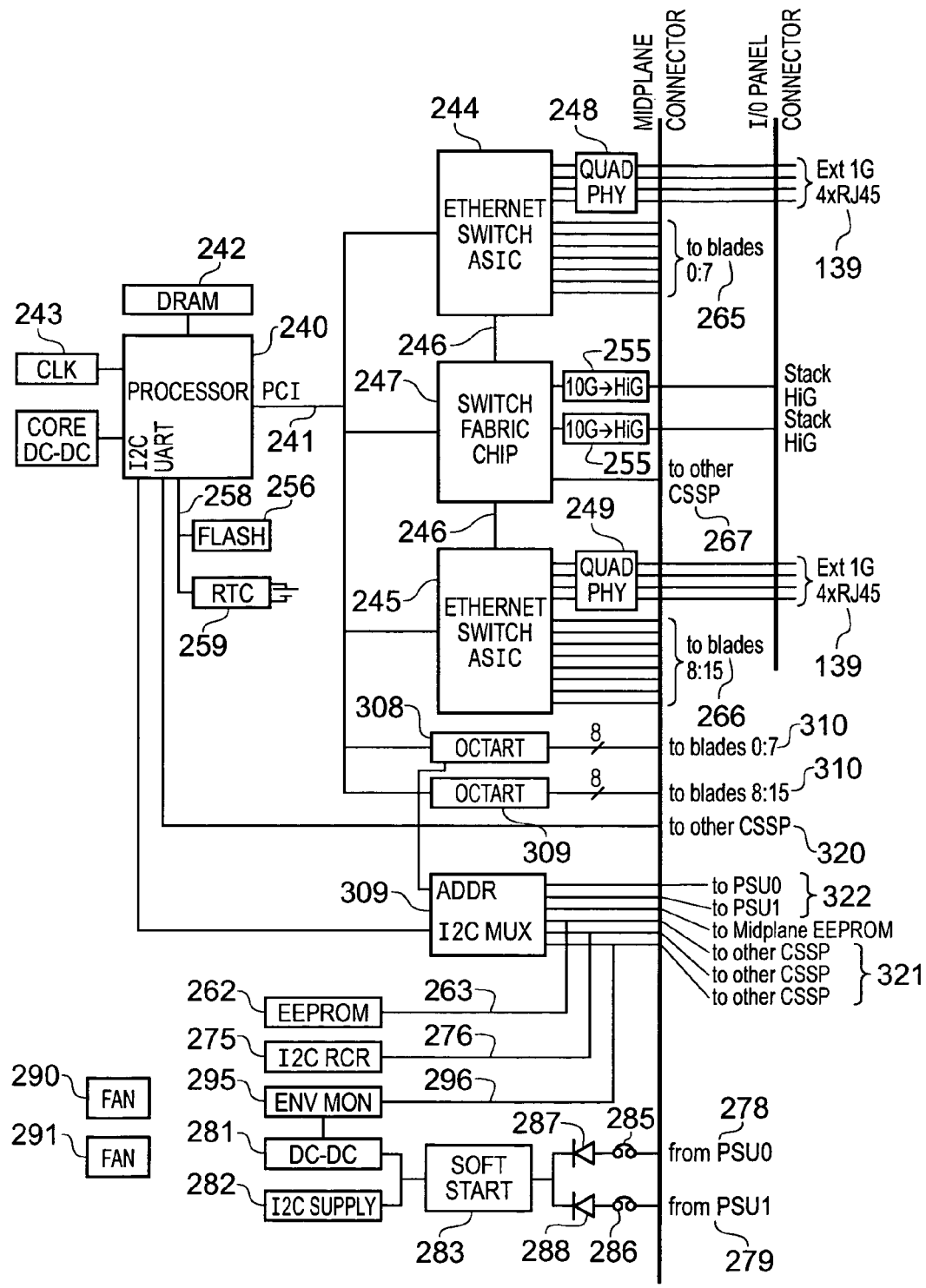
FIG. 6 is a functional block diagram of another example of an information processing subsystem for the combined switch and service processor module for the shelf of FIG. 2.

With reference to FIG. 6, there now follows a description of another example of a combined switch and service processor (CSSP) 71. In the present example, each CSSP 71 provides the functionality of a Switch and of a Shelf Service Processor 74. Components in common with the CSSP example of FIG. 5 have like reference numeral.

There now follows, with reference to FIG. 6, a description of the functional elements of a CSSP 71 as contained within a CSSP enclosure 121 receivable within a shelf enclosure.

FIG. 6 provides an overview of the functional components of the CSSP 71. In the present example, the two functions are provided by common components mounted to a single circuit board. It will be appreciated that such component arrangements are not necessary for successful operation and that any other component arrangement over any number of component boards can be easily achieved using conventional component arrangement techniques.

The midplane connector 141 on the CSSP 71 establishes the connection between the CSSP 71 and the midplane 171. In the present example, it delivers SerDes Ethernet outputs 265-267, I2C signals 310, 321 and 322, and power 278, 279. The connectors can be configured to facilitate hotswapping of the board, for example with a low insertion force. The connector can also use guide pins to increase the ease of serviceability and prevent module misalignment during insertion.

A switch microprocessor 240 is provided along with associated memory 242. The processor 240 can be connected to a PCI bus 241. A clock input to the processor 240 can be provided by a clock generator (CLK) 243.

In the present embodiment two Ethernet switch ASICs (application specific integrated circuits) 244, 245 are provided. The ASICs 244, 245 of the present example comprise integrated SerDes (serialiser/deserialiser) functionality. Each ASIC can provide twelve GMII Interfaces (1 Gigabit Ethernet) (for uplinks and downlinks) and one 10 Gb XGMII interface for chip-to-chip communication (bridging) 246 between the ASICs 244 and 245. Sixteen GMII 1 Gb 'downlinks', in the form of serialised Gb Ethernet data, are provided to allow each information processing cartridge 43 to communicate with the switch 73. Eight GMII 1 Gb 'uplinks' are provided for external communication through two quad PHYs 248 and 249 and RJ45 connectors on the rear panel 122. The RJ-45 connectors used in the present example have integrated LED indicators and magnetics. The ASICs 244 and 245 are configured via a PCI interface to the PCI bus 241.

Also provided is a single Switch Fabric Chip 247. The switch fabric chip 247 of the present example can provide eight 10 Gb XGMII interface ports. Of these eight interface ports, five are used in the present example. Two ports are used for communication between the Switch fabric chip 247 and the Ethernet Switch ASICs 244, 245 via the bridging 246. Two more 10 Gb ports provide HiGig™ 'stack uplinks' for external communication into a stack of shelves 41 through 10 Gb to HiGig™ interfce ICs 255 and 10GCX4 connectors on the rear panel 122. One port provides a 10 Gb 'crosslink' 267 for reliable communication with the other CSSPs received within the shelf 41 via the midplane.

Thus data connections to the information processing cartridges, stack connections, external 'uplink' connections and inter-CSSP connections are provided in the present example of a CSSP by the Ethernet Switch ASICs 244, 245 and the Switch Fabric Chip 247. In the present example, the external 'uplink' 1 Gb Ethernet connections are configurable under software control to provide for data or management connections. Thus each CSSP 71 may be connected to a management network via one or more of the external 1 Gb 'uplinks' (which may be grouped together to be treated as a single multiple of 1 Gb connection). In order to provide maximum flexibility in the utilization of the 'uplink' connections, all of the 'uplinks' may be connected into a single physical network and the total available bandwidth may be soft-configured into different virtual networks (VLANs). Thus data and management information may flow across a single physical network, but be divided such that the data and management networks appear totally separate from one another. The provision of a connection of this bandwidth provides sufficient capability for software deployment to information processing cartridges to be performed across a management network connection.

The processor 301 can also comprise an embedded UART (or at least one channel of an embedded DUART or other 'multi'-UART) to provide a redundant serial link 320 to the SSP 74 of the other CSSP 71. Although it would be possible to implement this link using an external UART, the advantage of using an embedded UART is that the connection to the other CSSP is reliable and therefore likely to be functional. Where the embedded UART link does not use the I2C Multiplexer for communications to the other CSSP, a common mode of failure for both the SSP-SSP I2C links can be avoided, it being assumed that the processor 301 is likely to be functional even if the embedded UART channel is non-functional.

Power for the CCSP 71 of the present example is provided in the same manner as for the CSSP of FIG. 5.

For IO to the midplane 171 shown in FIGS. 3A-C and 4A-C, the midplane connector 141 can include sixteen 1 Gb Ethernet connections 265-266 and one 10 Gb Ethernet connection 267 from the Ethernet Switch Asics 244, 245, the serial connections 310, 320, 321 and 322 and the power connections 278, 279.

Each CSSP 71 can access the I2C devices (FRU-ID EEPROM, I2C RCR, and environmental monitor) of another CSSP received in the same shelf via the I2C bus connections through the midplane 171.

For external IO, rear panel Gb Ethernet connections can be provided from the two Ethernet Switch Asics 244,245 to 2×4 stacked RJ45 connectors 139 (to give 8 uplinks). Each port can be an independent 10/100/1000 BASE-T (auto negotiating) port. The rear panel HiGig™ ports can be provided from 1 OGCX4 connectors.

In an alternative arrangement, the HiGig™ ports can be provided on a removable transition board received through the rear panel of the CSSP 71. The transition board connects to the 10 G to HiGig™ converters 255 and provides the rear I/O panel connectors. A number of different transition boards are receivable by the CSSP 71. Each different transition board provides external HiGig™ connectors in a different connector format. The transition board also includes any necessary interface hardware for converting the HiGig™ signals for transmission over the chosen medium. For example, the electrical signals from the 10 G to HiGig™ converters are converted into optical signals in a transition board having external optical fibre connections. Other connectors which can be provided by a transition board are connectors for copper interconnects, including 1 OGCX4 connectors.

Figure 7:
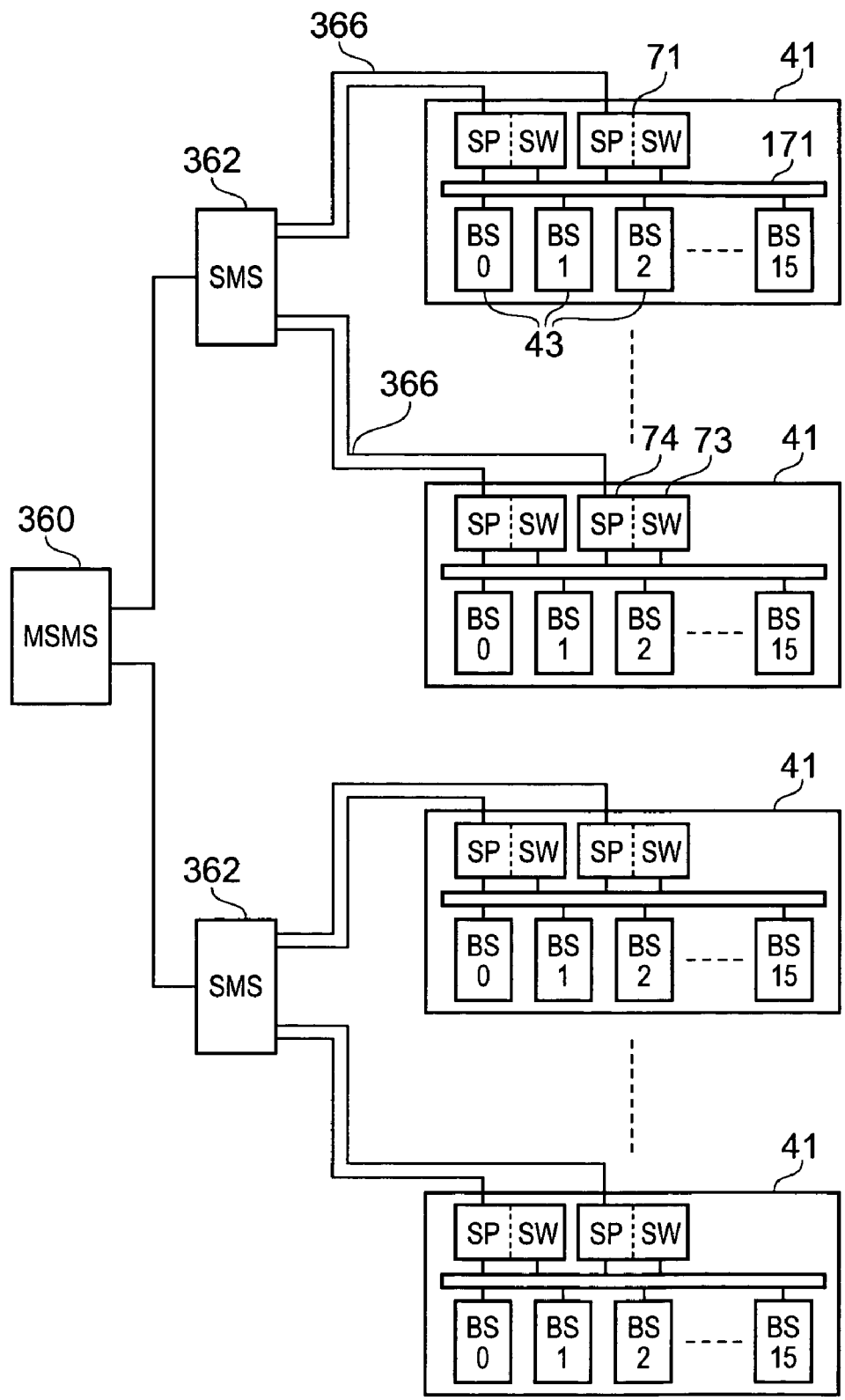
FIG. 7 is a schematic diagram showing a plurality of shelves connected together in a managed environment.

Thus there has now been described a modular computer system shelf and examples of a combined switch and service processor module for the modular computer system operable to provide switching and management services for the shelf. With reference to FIG. 7, there will now be described a system for automatically establishing a naming convention for one or more such shelves connected into a managed network.

FIG. 7 shows a plurality of shelves 41 connected into management network 366. Management of the network is provided from a system management server (SMS) 362. Where a large network is created, it may be appropriate to subdivide the network into sections, each section being managed by a separate SMS 362. Overall management of the network may then be performed by a master system management server (MSMS) 360. The MSMS 360 may be a SMS configured to act as a master or a dedicated MSMS entity. It should be understood that the shelves 41 will also be connected into a data network, however these connections are not shown in FIG. 7 for reasons of clarity.

It is conventional for human administrators of network systems to provide meaningful names to computer systems within the network to aid the management thereof. Such names often take the form of location indicators, such that a human administrator receiving an automated message (e.g. a fault message) regarding a particular component in the network can instantly recognize the physical location of the component. This allows a physical attendance at the subject of the message to be achieved with maximum efficiency. For example, an administrator of a large distributed company network may be physically located in a first city (e.g. Los Angeles) and the component requiring a physical attendance may be physically located in a second city (e.g. San Diego). There may be a substantial physical distance between the administrator and the component, however by knowing the location of the component, the administrator can decide whether to attend himself or to send a third party to attend. The third party may, for example, be a subordinate of the administrator or may be a subcontractor, either of whom may be physically located closer to the component that the administrator.

In the present example, such meaningful names may take the form <building location: rack location: rack shelf: shelf component> as shown in FIG. 8A. Applying the above example to that format, the component requiring attendance may be given the name "SanDiego-Rack34-Shelf2-Blade4", which would be shortened to, for example, "SanD-R34-S2-B4" as shown in FIG. 8B. Thus the component is uniquely identified within the network in question by a meaningful name which can be quickly and easily interpreted by a human administrator.

As will be appreciated, if in the above example, the San Diego location has 34 racks, each of which holds 8 shelves, each of which in turn houses 2 CSSPs and 16 blades, there are 4896 separate entities which require names assigning. It may also be reasonably assumed that the Los Angeles location would also have a large number of entities requiring names. Thus it can be seen that a potentially very large number of names requires assigning at the setup of a networked computer system. Additionally, every time a new component is added to such a system, a name must be assigned.

Therefore, in the present example, a protocol is used to automate the allocation of names to components of the network. During initial setup, a generic name pattern is provided. In the present example this takes the form described above of <building-rack-shelf-component>. As will be appreciated this format is not the only possibility and in fact any formulaic naming convention may be used. The generic naming pattern is then provided to a master management entity (MSMS 360) for the network, for example the SMS 362. The master management entity 360 is also provided with the high level names to be used. In the present example these are the building names.

The master management entity 360 then communicates the name pattern and relevant high level name to a senior management entity 362 for each high level name. For example, each building may have an SMS 362 which is the senior management entity for the building, but which is subordinate to the whole network MSMS 360 which is the master management entity. The senior management entity 362 in each building is thus informed of its own location name and the format for assigning names to other components within the building. Provided with this information, the senior management entity 362 can start to distribute names to the entities within its ambit. This may be performed in a centralized fashion, where each name is individually assigned by the senior management entity 362 to the components. Alternatively, the senior management entity 362 may distribute the allocation process to subordinate management entities such as the CSSPs 71 within the individual shelves. Thus the senior management entity 362 allocates the rack and shelf identifiers for each shelf and leaves the allocation of component names to the CSSPs 71 within the shelf. Another possibility is for the senior management entity 362 to provide a rack identifier to a rack-level management entity and have the allocation of shelf and component names performed thereby. A shelf-level management entity may be a dedicated entity or may be the CSSPs 71 within a nominated shelf in each rack.

Allocation of rack identifiers and/or of shelf identifiers may be performed automatically, or may be performed by a human technician or administrator. Such human interaction may be provided on a network wide basis (i.e. by an overall network administrator) or on a localized basis where a separate human provides the rack and/or shelf identifiers on a building by building basis.

The act of assigning a name to a particular entity in the present example includes at least determining the name to be assigned to a particular component and communicating that name, along with the IP address assigned to the component to a domain name server (DNS) (not shown) for the network. The name may also be communicated to the component in question, which may store the name such that upon interrogation it can give its name as well as FRUID and IP address and may also be included in messages sent from the component. The SSP part 74 of each shelf CSSP 71 could also store the names of at least the other components of its shelf such that messages generated by the CSSP would contain the name of the component without need for reference to the DNS.

Figure 9:
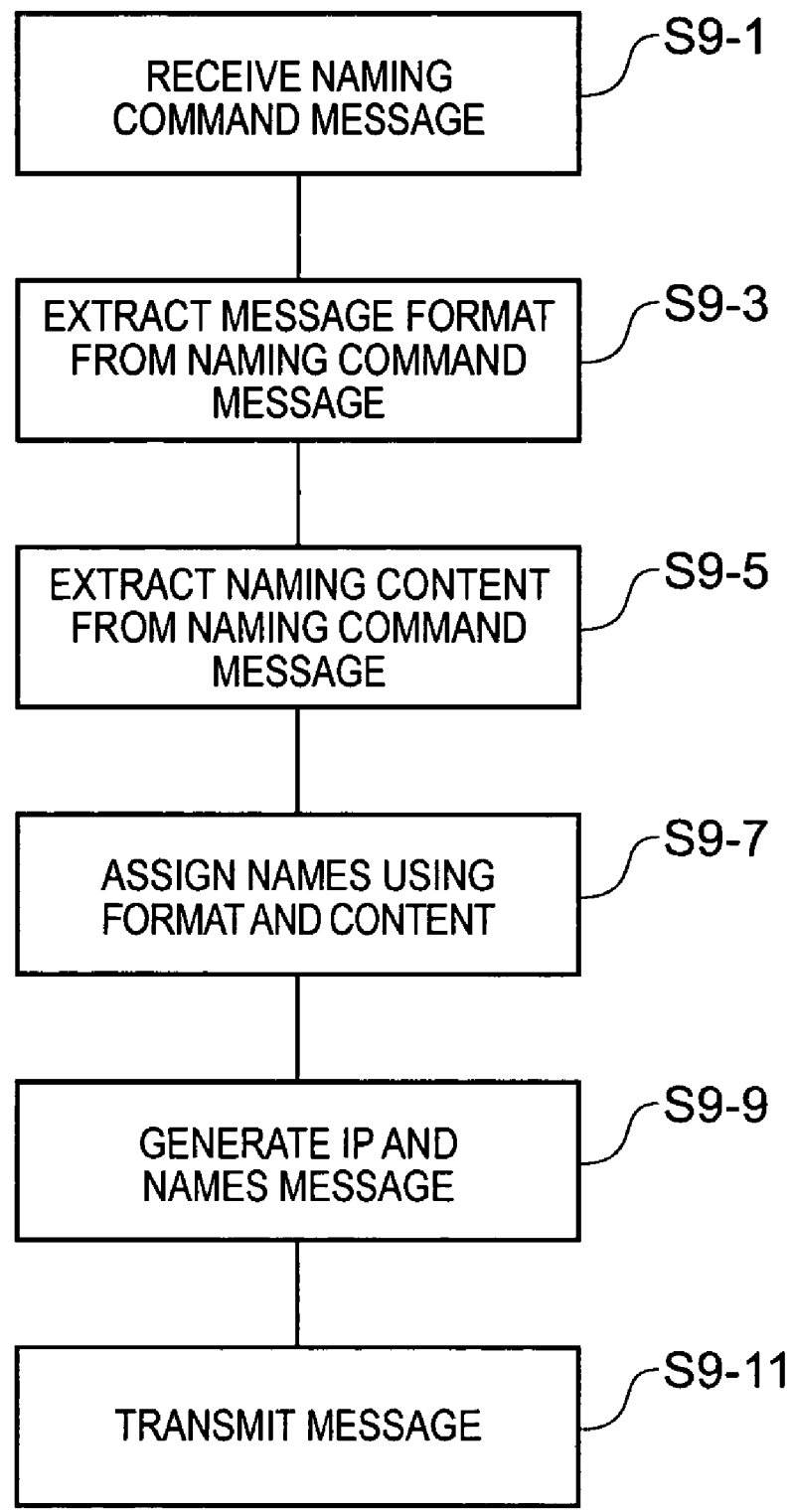
FIG. 9 is a flow diagram showing the steps in a naming operation performed by a combined switch and service processor module of FIG. 5 or 6.

With reference to FIG. 9, the steps performed by a CSSP 71 in assigning names to shelf components will now be described. First, at step S9-1, the CSSP 71 receives the naming command message from the master management entity 360 or senior management entity 362. This message is then analyzed, at step S9-3, to extract the naming format to be used (for example, that illustrated in FIG. 8A). At step S9-5, the naming content is extracted from the naming command message. The naming content would include high-level parts of the naming format, but exclude low-level parts. In the format shown in FIGS. 8A and 8B, the naming content may comprise the building location and rack location information. Alternatively the naming content could comprise the building location, rack location and rack shelf information.

The assigning of names to individual components is performed at step S9-7. The CSSP 71 uses the naming format and content to assign names to each individual component (FRU) within its jurisdiction. The scope of the jurisdiction may be pre-determined or may be set by instructions in the naming command message. The jurisdiction may extend to some of the FRUs within a shelf, all of the FRUs within a shelf or FRUs across multiple shelves. A decision on the extent of the jurisdiction of a given CSSP 71 may be taken dependent upon the circumstances of the networked computing environment in question.

Where the naming content supplied in the naming command message includes the building location and rack location, the CSSP 71 supplies the rack shelf and shelf component parts of the name for each component. Where the naming command message includes the building location, rack location and rack shelf, the CSSP 71 supplies the shelf component part of the name for each component. In the present example, the component names would typically be blade 0 (B0) to blade 15 (B15), CSSP0 to CSSP1, and PSU0 to PSU1 for the components within each shelf.

Once the names have been assigned, the CSSP 71 obtains IP addresses for the components within the shelf from those components and then generates an IP and names message at step S9-9. This message states the IP address of each named component and the meaningful name associated with that component. Finally, the CSSP 71 transmits the IP and names message to update a DNS server within the networked computing system. The DNS server is then able to associate references to IP addresses or meaningful names to their corresponding meaningful names or IP addresses respectively.

Thus there has been described the process by which meaningful names can be automatically assigned to components of a networked computing system in an efficient and coordinated manner.

As an alternative, the assigning of names could also be performed centrally by the DNS. In this case, the DNS would be provided with names for each component. The service processor of each shelf would then communicate with the DNS to retrieve the names for the components of its shelf from the DNS.

Thus there has now been described a modular computer system wherein each component therein may be assigned a unique meaningful name within a computer network into which the modular computer system is connected. The process of assigning the meaningful names can be automated from a central management entity and different levels of the assigning process can be performed by different level management entities within the computer network. Thus any message generated within the computer network regarding a particular computer system component can be easily associated with the physical component being referred to, thereby enabling optimum understanding of the message by a human recipient.

What is claimed is:

1. A computer system, comprising:
   a network interface;
   at least one processor, wherein the at least one processor is configured to:
   receive a naming command via the network interface, wherein the naming command specifies a format for generating a plurality of unique character sequences;
   in response to receiving the naming command, automatically create a plurality of names, each of which has a character sequence that is arranged according to the format specified in the naming command;
   automatically assign each of the plurality of names to a corresponding computer resource; and
   transmit the plurality of names and information identifying the corresponding computer resources to an external entity via the network interface.

2. The computer system of claim 1, wherein the format includes at least one of a geographical location identifier part, a housing identifier part and a module identifier part.

3. The computer system of claim 2, wherein the at least one processor is further configured to:
   receive, via the network interface, data describing a geographical location identifier part associated with a particular computer resource or a housing identifier part associated with the particular computer resource; and
   create one of the plurality of names using the received data.

4. The computer system of claim 2, wherein the processor is further configured to create at least the module identifier part.

5. The computer system of claim 1, wherein the processor is located within a first computer system housing and wherein one of the corresponding computer resources is located in a second computer system housing.

6. The computer system of claim 5, wherein the second computer system housing is located in the same geographical location as the first computer system housing.

7. The computer system of claim 6, wherein the second computer system housing is located in the same computer racking system as the first computer system housing.

8. The computer system of claim 1, wherein the format is of the form <building location: rack location: rack shelf: shelf component>, and wherein two or more of the unique character sequences include information specifying different shelf components.

9. The computer system of claim 1, wherein the information identifying the corresponding computer recourses include IP addresses of the corresponding computer resources.

10. The computer system of claim 1, wherein one of the corresponding computer resources is an information processing module.

11. The computer system of claim 1, wherein the external entity is a domain name system (DNS) server.

12. A computer system comprising:
    a network interface;
    at least one processor, wherein the at least one processor is configured to:
    receive a naming command via a network interface, wherein the naming command specifies a format for generating a plurality of unique character sequences;
    in response to receiving the naming command, automatically create a plurality of names, each of which has a character sequence that is arranged according to the format specified in the naming command;
    automatically assign each of the plurality of names to a corresponding physical component of the computer system; and
    transmit the plurality of names and information identifying the corresponding physical components to an external entity via the network interface.

13. A method comprising:
    generating a naming command at a management system that is external to a computer system, wherein the naming command specifies a format for generating a plurality of unique character sequences;
    the management system transmitting the naming command to the computer system via a network interface;
    wherein in response to receiving the naming command:
    a processor of the computer system automatically creates a plurality of names, each of which has a character sequence that is arranged according to the format specified in the naming command;
    the processor automatically assigns each of the plurality of names to a corresponding computer resource; and
    the processor transmits the plurality of names and information identifying the corresponding computer resources to an external entity via the network interface.

14. The method of claim 13, wherein the format includes at least one of a geographical location identifier part, a housing identifier part and a module identifier part.

15. The method of claim 13, wherein the processor is located within a first computer system housing and wherein one of the corresponding computer resources is located in a second computer system housing.

16. The method of claim 15, wherein the second computer system housing is located in the same geographical location as the first computer system housing.

17. A method comprising:
    receiving by at least one processor a naming command via a network interface, wherein the naming command specifies a format for generating a plurality of unique character sequences;
    in response to receiving the naming command, the at least one processor automatically creating a plurality of names, each of which has a character sequence that is arranged according to the format specified in the naming command;

the at least one processor automatically assigning each of the plurality of names to a corresponding computer resource; and the at least one processor transmitting the plurality of names and information identifying the corresponding computer resources to an external entity via the network interface.

18. The method of claim 17, wherein the format includes at least one of a geographical location identifier part, a housing identifier part and a module identifier part.

19. The method of claim 17, wherein the information identifying the corresponding computer recourses include IP addresses of the corresponding computer resources.

20. The method of claim 17, wherein one of the corresponding computer resources is a hardware component.

* * * * *